Patented Nov. 1, 1949

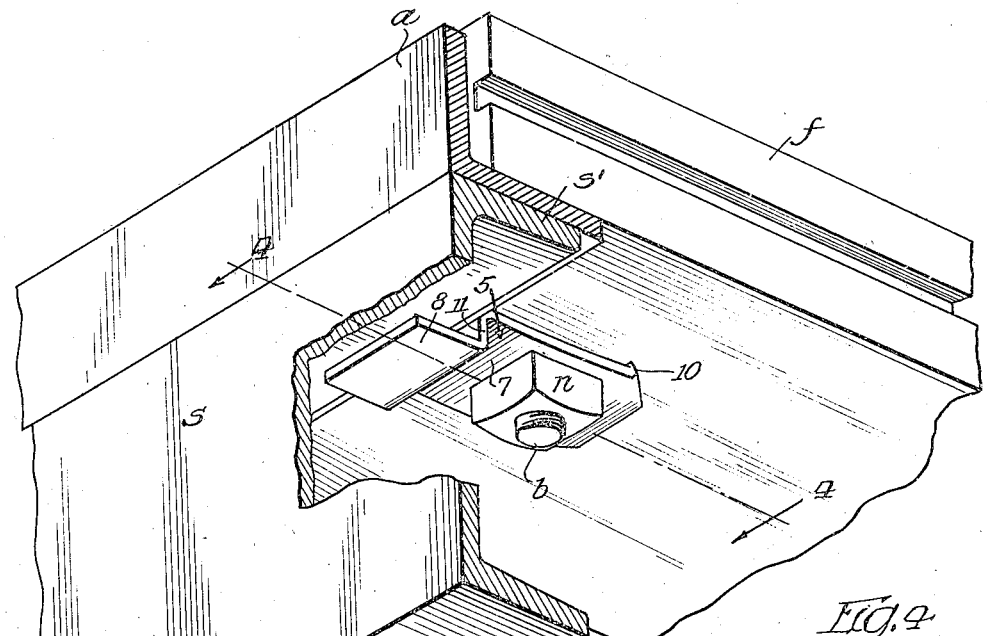

2,486,723

UNITED STATES PATENT OFFICE 2,486,723

FLOOR CLIP

Arthur H. Thompson, Chicago, Ill., assignor to Thompson-Bremer & Co., Chicago, Ill., a corporation of Illinois Application June 21, 1946, Serial No. 678,458

1 Claim. (Cl. 189—35)

The present invention relates generally to clips for use in yieldingly connecting the boards constituting the so-called floating floor of a freight car to the inwardly extending top flanges of the inside sills of the car. More particularly the invention relates to that type of clip which is formed of a metallic strip, underlies, and extends lengthwise of, the end of the floor board to which it is applied, embodies in its inner end part a hole for the shank of a bolt that extends downwards through the floor board and has a nut on its lower end for clamping said inner end part of the clip against the lower face of the floor board, and has the central portion thereof bent downwards and then outwards in order that the outer end part of the clip is downwardly offset with respect to the inner end part and underlies and engages slidably the top flange of the adjacent side sill.

Two forms of floor clips of the aforementioned type have heretofore been used or employed. In one form of clip the inner end part is flat and has a circular hole for the shank of the bolt. Such form of clip has in practice been found to be objectionable because it ncessitates the use of a separately formed lock washer for resisting loosening of the nut on the lower end of the bolt. When a separately formed lock washer is employed weight is added and undue time is consumed in applying the clip. In the other form of floor clip the inner end part is provided at one side thereof with a longitudinally extending, comparatively thin, strip, one end of which is formed integrally with the inner end part of the clip and the other end of which is free so that after application of the clip and tightening of the nut it may be bent downwards into a position whereint it engages or laps one side face of the nut and serves to hold the nut against reverse turning. The second form of formerly employed clip has proved in practice to be objectionable because when the clip is removed in connection with replacement of the floor board the free end of the nut locking strip fractures when bent out of its operative position to permit removal of the nut and thus prevents the clip from again being used.

One object of the invention is to provide a floor clip which is an improvement upon, and eliminates the defects of, previously designed floor clips and is characterized by the fact that the inner end part has around the hole defining portion thereof an annular series of equidistantly spaced, inwardly extending, integral tongues which have certain side portions thereof bent downwards to form teeth for resiliently engaging the upper end face of the nut and resisting loosening of the nut, and have the other side parts thereof bent upwards so as to form teeth which, upon tightening of the nut, embed themselves in the bottom face of the floor board and prevent the clip as a whole from turning relatively to the floor board. By employing an annular series of equidistantly spaced integral tongues of the aforementioned character the clip does not require the use of a separately formed lock washer or a bendable side strip that is subject to fracture, and hence may be made light in weight and may be used many times.

Another object of the invention is to provide a floor clip of the last mentioned character in which the inner end part is downwardly and longitudinally bowed to the end that when the nut on the lower end of the attaching bolt is tightened to its fullest extent the inner end part of the clip is caused to flatten and resultantly to subject the nut to such downward spring pressure as to augment the downwardly extending teeth in resisting loosening or reverse rotation of the nut.

A further object of the invention is to provide a floor clip of the type and character under consideration in which the free corners of the inner end part are bent upwards to form triangular or wedge shaped prongs which, in connection with preliminary tightening of the nut, embed themselves into the floor board and hence hold the clip against turning or angular displacement with respect to the floor board.

A still further object of the invention is to provide a floor clip which effectively and efficiently fulfills its intended purpose, is generally of new and improved construction, and is capable of being made light in weight and at a low and reasonable cost.

Other objects of the invention and the various advantages and characteristics of the present floor clip will be apparent from a consideration of the following detailed description.

The invention consists in the several novel features which are hereinafter set forth and are more particularly defined by the claim at the conclusion hereof.

In the drawing which accompanies and forms a part of this specification or disclosure and in which like numerals of reference denote corresponding parts throughout the several views:

Figure 1 is a bottom perspective view showing a clip embodying the invention in its operative position wherein it serves yieldingly to connect the superjacent end of a floor board forming a part of a so-called floating floor for a freight car to the top flange of the adjacent side sill of the car;

Figure 2 is a top perspective view showing the clip before it is placed in its operative position;

Figure 3 is a longitudinal section of the clip, taken on the line 3—3 of Figure 2 and illustrating in detail the manner in which the side parts of the inwardly extending tongues on the inner end part of the clip are bent so as to form downwardly and upwardly extending teeth; and Figure 4 is a longitudinal section showing the clip after it is in its operative position and illustrating in detail the manner in which the inner end part of the clip is so flattened as a result of complete tightening of the nut that it subjects the nut to downward spring pressure tending to resist loosening or reverse rotation of the nut.

The clip which is shown in the drawing constitutes the preferred form or embodiment of the invention. It is illustrated in connection with one end of a floor board $f$ and a freight car side sill $s$ and serves yieldingly to connect the floor board to the side sill. The board $f$ extends transversely of the freight car and forms with side by side similar boards (not shown) a so-called floating floor for the car. The side sill $s$ is in the form of a channel beam and embodies an inwardly extending right angle top flange $s'$. An angle iron $a$ overlies and extends lengthwise of the sill $s$, as shown in Figures 1 and 4 of the drawing. Such bar embodies a vertically extending flange and in addition an inwardly extending flange which is welded or otherwise fixedly secured to the top flange $s'$ of the sill. The end of the floor board to which the clip is applied overlies said top flange $s'$ of the sill and rests on, and engages slidably, the horizontally extending flange of the angle bar $a$. It is spaced from the vertically extending flange of the angle bar in order that the floor board $f$ is permitted to move longitudinally to a limited extent. A bolt $b$ and a nut $n$ serve releasably to connect the clip to the floor board. As best shown in Figure 4, the shank of the bolt extends downwards through a vertically extending hole $h$ that is formed in the floor board $f$ slightly inwards of the inwardly extending top flange $s'$ of the sill $s$ and the horizontally extending flange of the angle bar $a$. The head of the bolt rests on the top face of the floor board and the nut $n$ is mounted on the lower end of the bolt shank and is disposed slightly beneath the bottom face of the floor board.

The subject clip is formed of any suitable highly resilient metal, such as steel and underlies the end of the floor board that has the hole $h$. It is in the form of a one-piece stamping and consists of an elongated body 5 and an annular series of equidistantly and laterally spaced tongues 6.

The body 5 extends lengthwise of the floor board $f$ and embodies an inner end part 7 and an outer end part 8. The inner end part 7 has a centrally disposed circular hole 9 for the shank of the bolt $b$. It is downwardly and longitudinally bowed from one end thereof to the other in order that when the nut $n$ on the lower end of the attaching bolt $b$ is tightened to its fullest extent the inner end part 7 is caused to flatten and resultantly to subject the nut to such downward spring pressure as to resist loosening or reverse rotation of the nut. As shown in Figure 3, the inner end part 7 of the body 5 is straight in a crosswise or transverse direction. Because of this and the fact that the inner end part is bowed longitudinally from end to end the inner end part of the body is capable of flattening readily in connection with tightening of the nut $n$. The free corners of the inner end part 7 of the clip body 5 are bent upwards at right angles on lines at 135° angles to the adjacent inner edges of the inner end part to form equilaterally triangular or wedge shaped prongs 10. These prongs are adapted in connection with preliminary tightening of the nut to embed themselves into the bottom face of the floor board $f$ and serve when embedded in the floor board, to hold the clip against turning or angular displacement with respect to the floor board. When the inner end part 7 of the clip body is flattened due to tightening of the nut to its fullest extent the prongs are subjected to such upward spring pressure as to cause them firmly to remain in place. The central portion of the body of the clip extends vertically downwards from the adjacent end of the inner end part 7 and is designated by the reference numeral 11. It serves downwardly to offset the outer end part 8 of the clip body with respect to the inner end part 7 and is disposed slightly inwards of the inner side edges of the top flange $s'$ of the sill $s$ and the horizontally extending flange of the angle bar $a$ when the clip is in its operative position. As shown in Figure 4, the height of the central portion 11 of the clip body corresponds to the combined height of the aforementioned flanges. In forming the clip body the vertical central portion 11 is formed by bending downwards and then outwards the central portion of the blank from which the clip is formed. The outer end part 8 of the clip body is flat and underlies and engages slidably the inwardly extending top flange $s'$ of the sill $s$ when the clip is in place. The inner and outer end parts of the clip body and the central portion 11 are the same in width and thickness throughout.

The tongues 6 are formed integrally with, and project inwards from, the hole defining portion of the inner end part 7 of the clip body and constitute a medium whereby reverse rotation of the nut $n$ is resisted when the nut is in its operative or tightened position wherein it serves to clamp the inner end part of the clip body against the bottom face of the floor board $f$. They are preferably four in number and consist of central parts 12 and teeth forming side parts 13 and 14. The thickness of the various parts of the tongues corresponds to the thickness of the various parts of the washer body. The central parts 12 of the tongues are substantially flat and lie in the same plane as the inner end part 7 of the body. They are inwardly tapered and have curved or arcuate inner end faces 15. The latter are adapted to engage the shank of the bolt $b$ and serve to center the inner end part of the clip body with respect to the bolt shank. The side parts 13 are substantially square in cross section and are disposed in a counterclockwise position or direction with respect to the central parts 12 when the clip is viewed from the top. They are bent downwards so that they extend at approximately a 30° angle with respect to the inner end part 7. The outer lower edges of the side parts 13 are adapted to engage the upper end face of the nut $n$ and due to the inherent resiliency of the side parts 13, dig into said upper end face of the nut and thus resist reverse rotation of the nut with respect to the shank of the bolt. The other side parts of the tongues, i. e., the side parts 14, are the same in design and construction as the side parts 13, except that they are bent upwards. They extend upwards at approximately a 30° angle with respect to the inner end part of the clip body and are adapted when said inner end part 7 is flattened in connection with tightening of the nut n, to dig into the bottom face of the floor board f and hold the clip against turning or angular displacement with respect to the floor board. The ends of the tongue side parts 13 and 14 that are adjacent the hole defining portion of the body are separated from such portion by way of slits 16 in order that bending of the side parts is uniform throughout their length. The upwardly bent side parts 14 assist the prongs 10 in holding the clip against turning or rotation and the downwardly bent side parts 13 of the tongues augment the downward and longitudinal bowing of the inner end part of the clip in holding the nut n against loosening or reverse rotation.

When it is desired to use the clip the inner end part 7 of the clip body is first positioned so that the hole 9 therein is in axial alignment with the shank of the bolt and the outer end part 8 is in underlying relation with the top flange s' of the sill s. Thereafter the clip is shifted upwards so as to cause the tongues 6 to be brought in surrounding relation with the lower end of the shank and also cause the outer end part 8 of the body to be brought into engagement with the top flange of the sill. After so shifting or manipulating the clip the nut n is applied to the lower end of the bolt shank and is then tightened. It is contemplated that the nut will be tightened to its fullest extent. In connection with initial tightening of the nut the prongs 10 become so embedded in the bottom face of the floor board f that they serve to prevent turning or angular displacement of the clip with respect to the floor board. During final tightening of the nut the inner end part 7 of the clip body is flattened with the result that the upwardly bent side parts 14 of the tongues 6 become embedded in the bottom face of the floor board. When the inner end part of the clip body is flattened, due to full or complete tightening of the nut, it subjects the nut n to downward spring pressure which, as previously pointed out, augments the downwardly bent side parts 13 of the tongues 6 in resisting loosening or reverse rotation of the nut. During complete or final tightening of the nut the side parts 13 of the tongues flex upwards with the result that they engage the upper end face of the nut with spring pressure.

The herein described floor clip effectively and efficiently fulfills its intended purpose and may be produced at an extremely low cost due to the fact that it is in the form of a one-piece metallic stamping. It may be used over and over again and eliminates the necessity of using a separately formed lock washer to resist loosening of the nut on the attaching bolt to which the clip is applied. Because of its construction and design the clip may be made of comparatively light steel stock.

The invention is not to be understood as restricted to the details set forth since these may be modified within the scope of the appended claim without departing from the spirit and scope of the invention.

Having thus described the invention what I claim as new and desire to secure by Letters Patent is:

A one-piece stamped metal clip designed for use in connection with a freight car side sill having an inwardly extending top flange, a transversely extending floor board having one end thereof overlying the flange and a bolt extending downwards through said one end of the floor board at a point inwards of the sill flange and provided at the lower end of the shank thereof with a nut, adapted together with the nut equipped bolt yieldingly to secure said one end of the floor board in place, and comprising an elongated strip-formed body adapted to underlie and extend lengthwise of said one end of the floor board and consisting of a rectangular longitudinally elongated inner end part provided with a centrally disposed hole therein for receiving the lower end of the bolt shank and adapted to abut against the adjacent portion of the under surface of the floor board, an intermediate portion connected to, and extending downwards from, the inner end of said inner end part, and a substantially horizontal outer end part connected to, and extending outwards from, the lower end of the intermediate portion and adapted to underlie and engage slidably said sill flange, and an annular series of equidistantly spaced apart tongues connected to, and extending inwards from, the hole defining portion of the inner end part of the body and having the side parts thereof that extend in one direction bent downwards to form teeth for yieldingly engaging the nut when the latter is tightened and their other side parts bent upwards to form teeth for embedment in the superjacent portion of the floor board, the inner end part of the body being straight in a transverse direction and bowed downwards throughout its entire length and having the inner free corners thereof bent upwards at right angles on lines at substantially 135° angles to the adjacent edges of the inner end part in order to form equilateral triangular prongs adapted for embedment in the superjacent portion of the floor board and to coact with the upwardly bent other side parts of the tongues to hold the clip when in its operative position against turning or rotation.

ARTHUR H. THOMPSON.

REFERENCES CITED

The following references are of record in the file of this patent:

UNITED STATES PATENTS

| Number | Name | Date |
| --- | --- | --- |
| 1,176,688 | Morewood | Mar. 21, 1916 |
| 1,202,667 | Bearse | Oct. 24, 1916 |
| 1,911,384 | Olson | May 30, 1933 |
| 1,963,800 | Olson | June 19, 1934 |
| 2,250,343 | Zigler | July 22, 1941 |
| 2,355,986 | MacLean, Jr. et al. | Aug. 15, 1944 |